United States Patent [19]

Stehr et al.

[11] Patent Number: 5,180,856
[45] Date of Patent: Jan. 19, 1993

[54] POLYETHERS, THEIR PRODUCTION AND USE

[75] Inventors: Michael Stehr, Gelsenkirchen; Heinz-Werner Voges, Dorsten, both of Fed. Rep. of Germany

[73] Assignee: Huels Aktiengesellschaft, Marl, Fed. Rep. of Germany

[21] Appl. No.: 745,979

[22] Filed: Aug. 12, 1991

Related U.S. Application Data

[63] Continuation of Ser. No. 471,388, Jan. 29, 1990, abandoned.

[30] Foreign Application Priority Data

Feb. 15, 1989 [DE] Fed. Rep. of Germany ....... 3904488

[51] Int. Cl.$^5$ ............................................ C07C 43/11
[52] U.S. Cl. .................................... 568/617; 568/606
[58] Field of Search ................................ 568/617, 606

[56] References Cited

U.S. PATENT DOCUMENTS 4,481,123 11/1984 Hentschel et al. .

OTHER PUBLICATIONS

Il'chenko et al. Translation from Doklady Akad Nauk SSSR vol. 192, No. 5 (1071-1076) pp. (441-444) 1970.
Il'chenko et al. C.A. 73 88253a (1970).

Primary Examiner—Howard T. Mars
Attorney, Agent, or Firm—Oblon, Spivak, McClelland, Maier & Neustadt

[57] ABSTRACT

New polyethers based on tetrahydrofuran, with good lubricant properties. The invention concerns polyethers produced by copolymerizing tetrahydrofuran and glycidyl ether in the presence of alkanols. The new polyethers are useful as lubricants.

5 Claims, No Drawings

POLYETHERS, THEIR PRODUCTION AND USE

This application is a continuation of application Ser. No. 07/471,388, filed on Jan. 29, 1990, now abandoned.

BACKGROUND OF THE INVENTION

1. Field of the Invention

The present invention describes the preparation of new polyethers which can be used as lubricants, particularly as gear lubricants.

2. Discussion of the Background

The use of polyethers as lubricants or as an additive in conventional lubricant oils based on mineral oil is known. The state of the art as well as the demands generally made on such lubricants are particularly described in EP-PS 0 064 236. Suitable values for evaluating the quality of a lubricant oil are the viscosity index VI and the friction coefficient determined using a Reichert wear scale. High-quality lubricants are characterized by a high viscosity index, i.e. extensive temperature independence of the viscosity, as well as low friction coefficients. Additional criteria are compatibility with mineral oil, hydrophobic properties, low pour point and high resistance to heat.

According to EP-PS 0 064 236, polyethers which can be used as lubricants are obtained by copolymerization of a tetrahydrofuran with terminal oxiranes in the presence of monofunctional or bifunctional hydroxy compounds. The oxiranes used are long-chain 1,2-epoxyalkanes with 8–26 carbon atoms, which are used either alone or in a mixture with lower alkylene oxide components, such as ethylene, propylene and/or butylene oxide, as comonomers. These long-chain 1,2-epoxyalkanes can be replaced with glycidyl esters of neoalkane carboxylic acid to a certain extent (see Example 7). However, this measure results in a polyether with a significantly worsened viscosity/temperature behavior, as the comparison with a polyether having a similar molecular weight but not containing any glycidyl ester components shows (see Example 1). Glycidyl esters therefore do not represent an adequate substitute for 1,2-epoxyalkanes. The use of the latter group of compounds therefore appears to be essential for the synthesis of polyethers which satisfy the property profile required by EP-PS 0 064 236.

A need continues to exist for new polyethers which demonstrate good lubricant properties.

SUMMARY OF THE INVENTION

One object of the present invention is to provide a high-quality polyether lubricant oil.

This and other objects which will become apparent from the following specification have been achieved by the present polyethers which are obtained by polymerization of tetrahydrofuran with glycidyl ethers.

DETAILED DESCRIPTION OF THE PREFERRED EMBODIMENTS

It has been discovered that high-quality polyether lubricant oils are obtained if tetrahydrofuran is copolymerized with glycidyl ethers having the formula

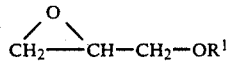

where $R^1$ is alkyl in the presence of alkanols with the general formula $R^2OH$, where $R^2$ is an alkyl or hydroxyalkyl group.

In the present process, polyethers are obtained by polymerization of tetrahydrofuran with the glycidyl ethers having the formula shown above, in the presence of alkanols having the formula $R^2$—OH, where $R^1$ represents alkyl groups with 3–20 carbon atoms, and $R^2$ represents alkyl groups with 8–24 carbon atoms, cycloalkyl groups with 6–12 carbon atoms in the ring, or hydroxyalkyl groups with 4–36 carbon atoms, as well as cycloalkanol groups with 6–15 carbon atoms in the ring.

Copolymerization of tetrahydrofuran and glycidyl ethers can be carried out by known methods (Angew. Chemi 72, 927–934 (1960)), by allowing the components to react in the presence of an alkanol, which acts as a molecular weight regulator under catalysis with Lewis acids, such as e.g. aluminum chloride, ferric chloride, tin (IV) chloride, titanium tetrachloride, antimony pentachloride and boron trifluoride, for example, as well as adducts thereof. A preferred Lewis acid is boron trifluoride diethyl etherate.

In the process according to the invention, the Lewis acid used as a polymerization initiator is used in an amount of about 0.01 to 5% by weight, relative to the entire reaction mixture.

The process according to the invention is generally carried out in a temperature range of from about $-10°$ C. to about $100°$ C., preferably between $0°$ and $80°$ C., and especially preferably between $20°$ and $60°$ C.

The process of the invention can be carried out at normal pressure or at higher pressures, preferably at normal pressure.

Typical glycidyl ethers used according to the invention are, e.g. n-butyl, n-hexyl, n-octyl, n-decyl, n-dodecyl, and n-tetradecyl glycidyl ether as well as 2-ethylhexyl, 2-propylheptyl and iso-tridecyl glycidyl ether. Preferred alkanols are 1-octanol, 1-nonanol, 1-decanol, 1-dodecanol, 1-tetradecanol, 1-hexadecanol, 1-octadecanol, 1,6-cyclohexane dimethanol, cyclooctanol, cyclooctanediol, cyclooctane dimethanol and cyclododecanol.

Glycidyl ethers are easily prepared from materials that are readily technically available. They are obtained, for example, by conversion of epichlorhydrin with alkanols to form 3-alkoxy-1-chlor-2-propanolene and subsequent intramolecular ring-closure in the presence of an alkali metal hydroxide. However, the production method for the glycidyl ethers used is not limited and includes any known method for preparing these ethers.

The lubricant properties of the polyethers according to the invention can be determined within wide limits by an advance selection of a certain glycidyl ether and an alkanol used as a molecular weight regulator, as well as by variation of the molar ratios of alkanol, tetrahydrofuran and glycidyl ether. The molar ratio of alkanols used to tetrahydrofuran and glycidyl ether varies, depending on the desired viscosity of the polyether oil. The viscosity depends on the molecular weight, i.e. the number of monomer units per polyether molecule and in the present polyethers the molar ratio is generally from 1:5 to 1:200. Compositions in which the molar ratio of tetrahydrofuran/glycidyl ether (THF/GE) is 1:6 to 15:1, preferably 1:3 to 8:1, especially preferably 1:1 to 5:1, are desirable. Polyether oils with low viscosity are, of course, those in which the proportion of the molecular weight regulator was selected to be high (e.g.

alkanol:THF:GE is about 1:4:2); polyethers with a high molecular weight, in other words highly viscous oils, are those in which the proportion of the molecular weight regulator was selected to be low (e.g. alkanol:THF:GE is about 1:40:15). By a corresponding selection of the regulator amount, polyethers with medium viscosity can also be produced.

Corresponding to the variable property profile, polyethers can be considered for different tribological areas of application: hydraulic fluids, brake fluids, metal processing fluids, lubricants for compressors and refrigerators, bearing and gear oils for units under high thermal stress (e.g. calenders) in the paper, textile and plastics industries.

The polyethers according to the invention can also be used as heat carrier oils.

It is known that particularly high-quality lubricant oils are obtained by adding suitable additives, preferably against oxidation, corrosion, wear and foaming, to polyethers. This also applies to the polyethers according to the invention. The suitable additives are selected from the very large number of known compounds and substances which are described in the literature to improve the oxidation, corrosion, wear and foaming resistance of synthetic or natural lubricant oils (see D. Klamann, Schmierstoffe und verwandte Produkte, Verlag Chemie, Weinheim 1982, p. 81 ff).

Other features of the invention will become apparent in the course of the following descriptions of exemplary embodiments which are given for illustration of the invention and are not intended to be limiting thereof.

EXAMPLES

Example 1

A mixture of 4 g n-decanol and 20 ml water-free tetrahydrofuran (THF) was mixed with 2.2 ml $BF_3.Et_2O$ and stirred for one hour at 45° C. After this time, a mixture of 12 g n-decanol, 180 ml water-free tetrahydrofuran and 60 g n-butyl glycidyl ether was slowly dripped in, with the temperature not exceeding 55° C. After the addition had been completed, the mixture was allowed to continue reacting for 64 h at room temperature. For processing, the reaction mixture was mixed with a solution of 3.8 g $Na_2CO_3$ (soda) in 20 ml water, stirred for one hour at room temperature and then the water and substances with a low boiling point were distilled off at a pot temperature of 100° C. and at normal pressure. The resulting residue was freed from precipitated solids by filtration or centrifugation. Finally, the oil was heated to 200° C. for 2 hours at a pressure of 0.05 torr, in order to remove volatile admixtures.

| | |
|---|---|
| Yield: | 135.0 g |
| Osmotic molecular weight: | 1,220 |
| Elemental analysis: | 66.21% C |
| | 11.44% H |
| | 22.37% O |
| Kinematic viscosity at | |
| 37.8° C. | 146.8 mm$^2$/s |
| 98.9° C. | 24.1 mm$^2$/s |
| Viscosity index: | 198 |

Example 2

A solution of 40 ml water-free THF and 5 g of a mixture of n-dodecanol and n-tetradecanol (3:1) was mixed with 2.8 ml $BF_3.Et_2O$ and stirred for one hour at 45° C. After this time, a mixture of 160 ml water-free THF, 120 g n-butyl glycidyl ether as well as 16 g of a mixture of n-dodecanol and n-tetradecanol was slowly dripped in, with the temperature not exceeding 55° C. The mixture was allowed to continue reacting for 20 h at room temperature, 4.6 g soda in 30 ml water was added, and the workup performed as in Example 1.

| | |
|---|---|
| Yield: | 230.4 g |
| Osmotic molecular weight: | 1,490 |
| Elemental analysis: | 66.82% C |
| | 11.21% H |
| | 22.70% O |
| Kinematic viscosity at | |
| 37.8° C. | 162.7 mm$^2$/s |
| 98.9° C. | 32.3 mm$^2$/s |
| Viscosity index: | 245 |

Example 3

A solution of 5 g of a mixture of n-dodecanol and n-tetradecanol (3:1) in 40 ml water-free THF was mixed with 2.0 ml $BF_3.Et_2O$ and stirred for one hour at 45° C. After this time, a mixture of 160 ml water-free THF, 30 g n-butyl glycidyl ether and 16 g $C_{12}/C_{14}$ alcohol was slowly dripped in, with the temperature not exceeding 55° C. After the addition was complete, the mixture was allowed to continue reacting for 20 h at room temperature, the reaction mixture was mixed with 3.3 g soda in 20 ml water, and worked up as in Example 1.

| | |
|---|---|
| Yield: | 100 g |
| Osmotic molecular weight: | 1,070 |
| Elemental analysis: | 67.48% C |
| | 11.52% H |
| | 20.89% O |
| Kinematic viscosity at | |
| 40° C. | 93.7 mm$^2$/s |
| 100° C. | 16.6 mm$^2$/s |
| Viscosity index: | 191 |

Example 4

A solution of 3.1 g of a mixture of n-dodecanol and n-tetradecanol (3:1) in 18 ml water-free THF was mixed with 1.4 ml $BF_3.Et_2O$ and stirred for one hour at room temperature. After this time, a solution of 39.5 g of the alcohol mixture described above and 103 g n-butyl glycidyl ether was slowly dripped in, so that the temperature did not exceed 55° C. After the addition was complete, the mixture was stirred for another 22 h at room temperature, then mixed with a solution of 2.3 g soda in 20 ml water, and worked up as in Example 1.

| | |
|---|---|
| Yield: | 118.6 g |
| Osmotic molecular weight: | 870 |
| Elemental analysis: | 67.28% C |
| | 11.32% H |
| | 21.35% O |
| Kinematic viscosity at | |
| 40° C. | 49.3 mm$^2$/s |
| 100° C. | 9.3 mm$^2$/s |
| Viscosity index: | 175 |

Example 5

A solution of 13.0 g of a mixture of n-hexadecanol and n-octadecanol (1:2) in 100 ml water-free THF was mixed with 3.2 ml $BF_3.Et_2O$ and stirred for one hour at 45° C. After this time, a solution of 95.6 g n-butyl glycidyl ether and 200 ml water-free THF was slowly dripped in, with the temperature not exceeding 55° C. After the addition was complete, the mixture was stirred for 68 hours at room temperature, 5.3 g soda in 30 ml water was added, and workup continued as usual.

| | |
|---|---|
| Yield: | 258.6 g |
| Osmotic molecular weight: | 1,920 |
| Elemental analysis: | 66.11% C |
| | 11.19% H |
| | 22.82% O |
| Kinematic viscosity at | |
| 40° C. | 480.2 mm²/s |
| 100° C. | 82.3 mm²/s |
| Viscosity index: | 256 |

Example 6

1.8 ml boron trifluoride etherate was added to a solution of 10 g decanol in 25 ml water-free THF. The mixture was stirred for one hour at 45° C. and then, a mixture of 83.0 g n-decyl glycidyl ether and 125 ml water-free THF was slowly dripped in, so that the temperature does not exceed 55° C. After the addition was complete, the mixture was allowed to react for another 22 hours at room temperature. For workup, the reaction mixture was mixed with a solution of 3.0 g soda in 50 ml water, and further processing took place as in Example 1.

| | |
|---|---|
| Yield: | 145 g |
| Osmotic molecular weight: | 1,650 |
| Elemental analysis: | 70.66% C |
| | 12.28% H |
| | 17.62% O |
| Kinematic viscosity at | |
| 40° C. | 173.1 mm²/s |
| 100° C. | 27.6 mm²/s |
| Viscosity index: | 198 |

Example 7

2.4 ml boron trifluoride etherate was added to a solution of 11.5 g 1,5-cyclooctane dimethanol in 30 ml water-free THF. The mixture was stirred for one hour at 45° C., and then, a mixture of 65.0 g n-butyl glycidyl ether and 220 ml water-free THF was slowly dripped in, so that the temperature does not exceed 55° C. After the addition was complete, the mixture was allowed to react for another 22 hours at room temperature. For workup, the reaction mixture was mixed with a solution of 4.0 g Na$_2$CO$_3$ in 90 ml water, and further workup took place as in Example 1.

| | |
|---|---|
| Yield: | 150.2 g |
| Osmotic molecular weight: | 1,220 |
| Elemental analysis: | 66.01% C |
| | 11.21% H |
| | 23.27% O |
| Kinematic viscosity at | |
| 40° C. | 318.3 mm²/s |
| 100° C. | 42.5 mm²/s |
| Viscosity index: | 188 |

Obviously, numerous modifications and variations of the present invention are possible in light of the above teachings. It is therefore to be understood that within the scope of the appended claims, the invention may be practiced otherwise than as specifically described herein.

What is claimed is:

1. A polyether obtained by the process consisting essentially of:

polymerizing tetrahydrofuran with a glycidyl ether having the formula:

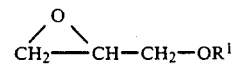

in the presence of at least one alcohol having the formula R$^2$—OH, wherein R$^1$ is an alkyl group with 3–20 carbon atoms, and R$^2$ is an alkyl group with 8–24 carbon atoms, a cycloalkyl group with 6–12 carbon atoms in the ring, a hydroxyalkyl group with 4–36 carbon atoms, or a cycloalkanol group with 6–15 carbon atoms in the ring to form a polymer, said polymer having an osmotic molecular weight of 870–1920, wherein the molar ratio of said alkanol to tetrahydrofuran and glycidyl ether is about 1:5 to 1:200, the molar ratio of tetrahydrofuran to glycidyl ether is about 1:6 to 15:1, and wherein the polymerization is carried out at a temperature of from about −10° C. to about 100° C. in the presence of 0.01–5 weight % of a Lewis acid catalyst.

2. The polyether of claim 1, wherein the molar ratio of tetrahydrofuran and glycidyl ether used is 1:3 to 8:1.

3. The polyether of claim 1, wherein the molar ratio of tetrahydrofuran and glycidyl ether used is 1:1 to 5:1.

4. The polyether of claim 1, wherein R$^1$ is an alkyl group with 6–20 carbon atoms.

5. The polyether of claim 1, wherein R$^1$ is an alkyl group with 10–20 carbon atoms.

* * * * *